(12) United States Patent
Narasimhan

(10) Patent No.: US 8,755,272 B2
(45) Date of Patent: Jun. 17, 2014

(54) DETERMINING WLAN EDGES

(75) Inventor: Partha Narasimhan, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 201 days.

(21) Appl. No.: 13/023,395

(22) Filed: Feb. 8, 2011

(65) Prior Publication Data

US 2011/0194442 A1  Aug. 11, 2011

Related U.S. Application Data

(60) Provisional application No. 61/302,413, filed on Feb. 8, 2010.

(51) Int. Cl.
| | | |
|---|---|---|
| *H04L 12/26* | (2006.01) | |
| *H04W 4/00* | (2009.01) | |
| *H04L 12/28* | (2006.01) | |
| *H04W 24/00* | (2009.01) | |
| *H04W 36/00* | (2009.01) | |
| *H04W 84/12* | (2009.01) | |
| *H04W 88/06* | (2009.01) | |

(52) U.S. Cl.
CPC .......... *H04W 36/0083* (2013.01); *H04W 84/12* (2013.01); *H04W 88/06* (2013.01); *H04W 36/0055* (2013.01)
USPC ........... 370/230; 370/252; 370/332; 370/400; 455/456.1

(58) Field of Classification Search
USPC ................. 370/310–350, 241–252, 400–411; 455/431–466
See application file for complete search history.

(56) References Cited

U.S. PATENT DOCUMENTS

| | | | | |
|---|---|---|---|---|
| 6,430,414 | B1* | 8/2002 | Sorokine et al. | 455/442 |
| 7,236,788 | B2* | 6/2007 | Mohebbi | 455/437 |
| 7,447,174 | B2* | 11/2008 | Joshi | 370/328 |
| 7,535,883 | B2* | 5/2009 | Kim et al. | 370/338 |
| 7,706,337 | B2* | 4/2010 | Pandey et al. | 370/338 |
| 7,733,831 | B2* | 6/2010 | Samuel et al. | 370/335 |
| 8,023,468 | B2* | 9/2011 | Liu et al. | 370/331 |
| 8,095,134 | B2* | 1/2012 | Huang et al. | 455/436 |
| 8,144,662 | B2* | 3/2012 | Xing et al. | 370/331 |
| 8,204,442 | B2* | 6/2012 | Sankar et al. | 455/63.1 |
| 8,320,331 | B2* | 11/2012 | Vikberg et al. | 370/331 |
| 2007/0281700 | A1* | 12/2007 | Deguchi et al. | 455/436 |
| 2010/0069072 | A1* | 3/2010 | Gogic et al. | 455/436 |
| 2012/0015649 | A1* | 1/2012 | Li et al. | 455/434 |
| 2012/0307927 | A1* | 12/2012 | Nammi et al. | 375/267 |

* cited by examiner

*Primary Examiner* — Tri H Phan
(74) *Attorney, Agent, or Firm* — Varun A. Shah

(57) ABSTRACT

Determining whether a station is at the edge of wireless local area network (WLAN) coverage. In an IEEE 802.11 wireless network comprising one or more access points (APs) which may optionally be connected to one or more controllers, with wireless clients connected to those APs. Station S connected to AP A collects reports such as beacon reports which contains information on all APs station S can hear, including signal strengths. AP A collects a neighbor report which contains information on all APs in its neighborhood including signal strengths. These reports from A and S are observed and compared over time to determine when S is at or is moving to the edge of WLAN coverage. For example, if the only entry in the beacon list for client S is AP A to which it is connected, and the signal strength is decreasing over time, S is at the edge of WLAN coverage and is moving away from the WLAN. The process may be implemented at a controller, at a client, or both.

24 Claims, 1 Drawing Sheet

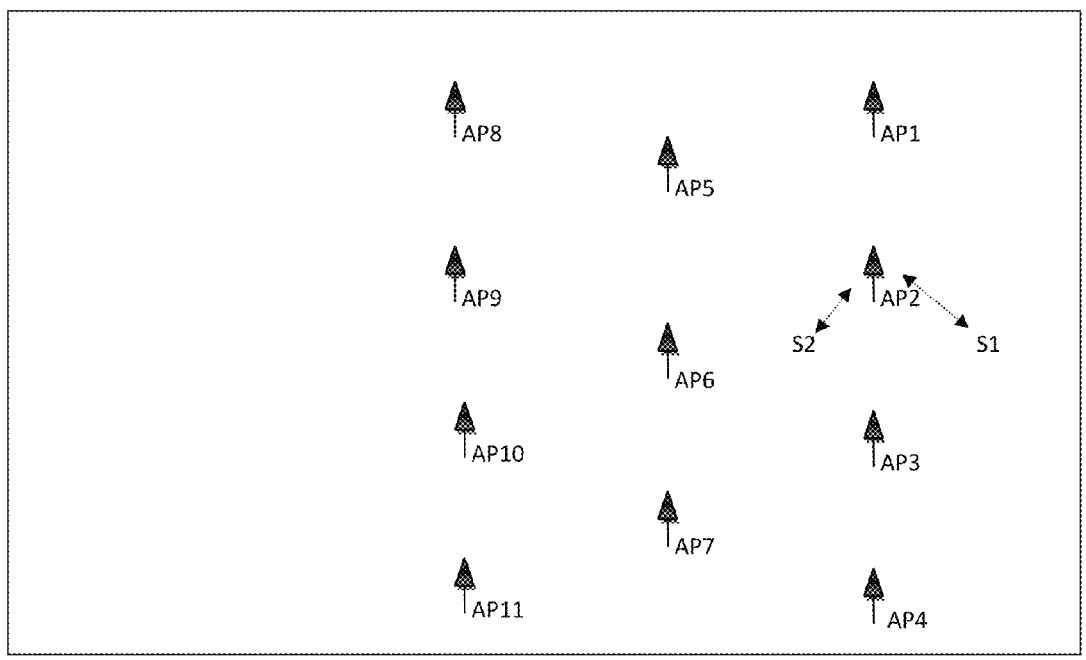

DETERMINING WLAN EDGES

CROSS-REFERENCES TO RELATED APPLICATIONS

This application claims the benefit of priority on U.S. Provisional Patent Application No. 61/302,413 filed Feb. 8, 2010 and entitled "Determining WLAN Edges".

BACKGROUND OF THE INVENTION

The present invention relates to wireless digital networks, and in particular, to the problem of determining when a station is at the edge of wireless local area network (WLAN) coverage.

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks.

Also increasing in popularity are dual-mode handsets, which are handsets supporting not only a cellular/wireless wide area network (WWAN) interface, for example, GSM, CDMA, 3G or 4G, but also a wireless interface such as IEEE 802.11 WiFi. Such dual-mode handsets when used with properly configured and operating wireless local area networks (WLANs) offer the use of WiFi connections while the handset is within the enterprise, and cellular connections while outside the enterprise.

Handover of voice calls and data sessions between cellular and WLAN networks is a key concern for handset users and the designers of the WLANs they use.

In order to aid the timely handover of calls and sessions from a WiFi network to a WWAN, it is important to recognize when a dual-mode handset that is using WiFi is approaching the edge of WLAN coverage and is at risk of losing that coverage so that the required signaling can be completed between the WLAN and the WWAN to transition calls and/or data sessions before WLAN coverage is completely lost.

Being on the edge of WLAN coverage is a property of a client associated to a WiFi network. A initial assessment of this property may be made by identifying those APs along the edge of the WLAN; clients associated to one of these edge APs are on the edge of the WLAN. But association with an edge AP is not sufficient. Two clients may be associated with the same edge AP and be in different states. As an example, one client may be moving away from the edge AP and into the interior of the network. The other client may be moving away from the edge AP and away from the WLAN network entirely.

What is needed is a way of better identifying client devices on the edge of WLAN coverage in the network.

BRIEF DESCRIPTION OF THE DRAWINGS

The invention may be best understood by referring to the following description and accompanying drawings that are used to illustrate embodiments of the invention in which:

FIG. 1 shows clients in a wireless network.

DETAILED DESCRIPTION

Embodiments of the invention relate to methods determining whether a wireless client is at the edge of wireless local area network (WLAN) coverage. A WLAN has a plurality of access points (APs) which optionally may be supported by one or more controllers. Wireless client S is connected to AP A. Station S collects reports which contain information on all APs station S can hear, including signal strengths. AP A collects a neighbor report which contains information on all APs in its neighborhood including signal strengths. These reports from A and S are observed and compared over time to determine when S is at or is moving to the edge of WLAN coverage. For example, if the only entry in the station list for client S is AP A to which it is connected, and the signal strength is decreasing over time, S is at the edge of WLAN coverage and is moving away from the WLAN. The process may be implemented at a controller, at a client, or both.

FIG. 1 shows a network in which AP1-AP11 are access points on a wireless network. Stations S1 and S2 are portable wireless clients.

As is known to the art, access points AP1-AP11 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, access points AP1-AP11 operate under control of a LINUX operating system, with purpose-built programs providing host controller and access point functionality.

Similarly, stations S1 and S2 are wireless client devices with similar architectures, comprising at least a processor, memory hierarchy, and input/output interfaces including a wireless interface with which to communicate with APs AP1-AP11. Examples of such devices include dual-mode phones, laptop, and handheld systems using IEEE 802.11 wireless interfaces.

According to the invention, station S collects a list of APs it can hear through its wireless interface, including signal strengths.

Similarly according to the invention, at least the AP to which S is connected, and preferably all APs in the network collect lists or reports of APs in its neighborhood that it can hear through its wireless interface, including their signal strengths.

According to the IEEE 802.11k amendment, an AP neighbor report is a list of IEEE 802.11 access points (APs) and their received signal strengths that a particular AP considers its neighbors on the wireless network. This list may be refreshed periodically or on demand.

Also according to the IEEE 802.11kl draft standard, a beacon report is a list of APs that a client station can hear, including received signal strengths. A beacon report can contain the list of APs in a client station's cache based on periodic background scans, or an AP can request that the client station perform a new scan and report the results back to the AP.

According to the present invention, a client station is said to be at the edge of WLAN coverage if it is at risk of losing a good signal to the AP that it is currently associated to, and the client station is not able to move to another AP in the WLAN before WLAN connectivity is lost.

Identifying APs that form the edge of a WLAN is known to the art. One method is to simply mark an AP as an edge AP based on its physical location. This determination is made, for example, during installation of the AP and the wireless network.

While it is necessary for a client station to be associated with an edge AP to be at the edge of WLAN coverage, this condition is not in and of itself sufficient. Not all client stations associated to an edge AP are on the edge of WLAN coverage.

Referring to FIG. 1, client stations S1 and S2 are both associated to AP2, which is an edge AP. But client station S2 is located towards the interior of the WLAN coverage area, while client station S1 is on the edge of the WLAN coverage area.

Referring now to FIG. 1, assume client station S1 is associated to AP2. According to an aspect of the invention, the beacon report from client station S1 and the neighbor report from AP AP2 are compared to determine if client station S1 is on or moving to the edge of the WLAN coverage area.

In the description following, let $S_B$ denote the set of APs contained in the beacon report from client station S, and let $A_N$ denote the set of APs in the neighbor report for AP A. there are multiple outcomes from the comparison of these two sets.

Case 1: $S_B$ is not a subset of $A_N$, i.e. $S_B$ contains some elements that are not also members of $A_N$. In this case, client station S can hear APs that are not in AP A's neighbor list. This is most likely to happen when client station S is in the interior of the network. If AP A is an edge AP, and the size of the subset of $S_B$ whose members are not in $A_N$ is increasing, then client station S is moving towards the interior of the network.

Case 2: $S_B$ is a subset of $A_N$ and the signal strength from some of the APs in $S_B$ increase across multiple beacon reports. $S_B$ could either be a proper subset of $A_N$ or be equal to $A_N$. If AP A is an edge AP, then the most likely scenario here is that the station is moving in a direction that is perpendicular to the periphery of WLAN coverage. Given that the station is finding APs that are increasing in signal strength it is less likely to be at a location where there is risk of total loss of WLAN coverage.

Case 3: $S_B$ is a subset of $A_N$ and the signal strength from all the APs in $S_B$ are decreasing across multiple beacon reports. $S_B$ could either be a proper subset of $A_N$ or be equal to $A_N$. If AP A is an edge AP, then the most likely scenario here is that the station is moving towards the periphery of WLAN coverage area and is at risk of losing WLAN coverage.

Case 4: AP A is the only member of $S_B$. The station is not able to hear any AP other than the one it is currently associated to. If the signal strength of the link to AP A is decreasing and falls below a certain threshold then the station is at very high risk of losing WLAN coverage.

It is useful to note that this process may be implemented in the client device, or in the WLAN, at the APs, or in the controller responsible for the APs.

When implemented in the client device, the client can initiate transition of WiFi calls and/or data sessions to WWAN. When implemented in APs or in the controller, the controller may initiate the transition of the client from WiFi to WWAN.

As is understood in the art, the controller and access points are purpose-built digital devices, each containing a CPU for executing instructions and manipulating data, a memory hierarchy for storing data and instructions, and input/output devices such as wired and wireless communications ports.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A method comprising:
    identifying a neighbor list comprising a first set of access points within a radio frequency (rf) range of a first access point;
    identifying a second set of access points detected by a first station, the first station being within a rf range of the first access point; and
    determining that the first station is near an edge of a wireless coverage area corresponding to a plurality of access points on a wireless digital network based at least on comparing (a) the first set of access points within the rf range of the first access point and (b) the second set of access points detected by the first station;
    wherein the method is performed by at least one device comprising a hardware processor.

2. The method of claim 1, further comprising determining that the first station is moving toward the edge of the wireless coverage provided by the plurality of access points based at least on the comparing operation.

3. The method of claim 2, wherein determining that the first station is moving toward the edge of the wireless coverage provided by the plurality of access points is based further on a change in signal strength between the first station and one or more access points in the second set of access points.

4. The method of claim 1, wherein the second set of access points comprises access points detected by the station over different periods of time.

5. The method of claim 1, wherein the first set of access points is identified based on detection of wireless signals from each of the first set of access points by the first access point.

6. The method of claim 1, wherein determining that the first station is near the edge of the wireless coverage provided by the plurality of access points on the wireless digital network is further based on determining that the first station is unable to associate with another access point in the plurality of access points.

7. The method of claim 1, further comprising initiating a transfer of active calls and/or data sessions for the first station from the first access point to another device in a Wireless Wide Area Network (WWAN).

8. The method of claim 1, wherein the identifying operation comprises determining that the first set of access points are within a wireless communication range from the first access point.

9. A non-transitory computer readable medium comprising instructions which, when executed by one or more hardware processors, causes performance of operations comprising:
   identifying a neighbor list comprising a first set of access points within a radio frequency (rf) range from a first access point;
   identifying a second set of access points detected by a first station, the first station being within a radio frequency (rf) range from the first access point; and
   determining that the first station is near an edge of a wireless coverage area corresponding to a plurality of access points on a wireless digital network based at least on comparing (a) the first set of access points within the rf range from the first access point and (b) the second set of access points detected by the first station.

10. The medium of claim 9, further comprising determining that the first station is moving toward the edge of the wireless coverage provided by the plurality of access points based at least on the comparing operation.

11. The medium of claim 10, wherein determining that the first station is moving toward the edge of the wireless coverage provided by the plurality of access points is based further on a change in signal strength between the first station and one or more access points in the second set of access points.

12. The medium of claim 9, wherein the second set of access points comprises access points detected by the station over different periods of time.

13. The medium of claim 9, wherein the first set of access points is identified based on detection of wireless signals from each of the first set of access points by the first access point.

14. The medium of claim 9, wherein determining that the first station is near the edge of the wireless coverage provided by the plurality of access points on the wireless digital network is further based on determining that the first station is unable to associate with another access point in the plurality of access points.

15. The medium of claim 9, wherein operations further comprise initiating a transfer of active calls and/or data sessions for the first station from the first access point to another device in a Wireless Wide Area Network (WWAN).

16. The medium of claim 9, wherein the identifying operation comprises determining that the first set of access points are within a wireless communication range from the first access point.

17. A system comprising:
   at least one device including a hardware processor;
   the system being configured to perform operations comprising:
   identifying a neighbor list comprising a first set of access points within a radio frequency (rf) range from a first access point;
   identifying a second set of access points detected by a first station, the first station being within a radio frequency (rf) range from the first access point; and
   determining that the first station is near an edge of a wireless coverage area corresponding to a plurality of access points on a wireless digital network based at least on comparing (a) the first set of access points within the rf range from the first access point and (b) the second set of access points detected by the first station.

18. The system of claim 17, further comprising determining that the first station is moving toward the edge of the wireless coverage provided by the plurality of access points based at least on the comparing operation.

19. The system of claim 18, wherein determining that the first station is moving toward the edge of the wireless coverage provided by the plurality of access points is based further on a change in signal strength between the first station and one or more access points in the second set of access points.

20. The system of claim 17, wherein the second set of access points comprises access points detected by the station over different periods of time.

21. The system of claim 17, wherein the first set of access points is identified based on detection of wireless signals from each of the first set of access points by the first access point.

22. The system of claim 17, wherein determining that the first station is near the edge of the wireless coverage provided by the plurality of access points on the wireless digital network is further based on determining that the first station is unable to associate with another access point in the plurality of access points.

23. The system of claim 17, wherein operations further comprise initiating a transfer of active calls and/or data sessions for the first station from the first access point to another device in a Wireless Wide Area Network (WWAN).

24. The system of claim 17, wherein the identifying operation comprises determining that the first set of access points are within a wireless communication range from the first access point.

* * * * *

UNITED STATES PATENT AND TRADEMARK OFFICE
CERTIFICATE OF CORRECTION

PATENT NO. : 8,755,272 B2
APPLICATION NO. : 13/023395
DATED : June 17, 2014
INVENTOR(S) : Narasimhan Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this
Eleventh Day of August, 2015

Michelle K. Lee
*Director of the United States Patent and Trademark Office*